Nov. 7, 1961　　　　M. MAHARICK　　　　3,007,716
AIR CELL SUPPORTED ROAD VEHICLE FRAME
Filed Aug. 18, 1960

INVENTOR.
MATT MAHARICK
BY
WATTS, EDGERTON, PYLE & FISHER
ATTORNEYS 3,007,716
AIR CELL SUPPORTED ROAD VEHICLE FRAME
Matt Maharick, Niles, Ohio, assignor to Youngstown Steel Car Corporation, Niles, Ohio, a corporation of Ohio
Filed Aug. 18, 1960, Ser. No. 50,379
6 Claims. (Cl. 280—124)

This invention relates broadly to pneumatic air cells for vehicular bodies and more specifically to improvements in the relation thereof to the undercarriage for the vehicle.

One of the objects of the invention is to provide a frame cross member, an axle draw bar and stabilizer therefor, a pair of bolsters for the air cells and a pair of resilient buffer blocks to snub the vertical movement of the air cells and axle.

Another object of the invention is to provide a structure in which the bolsters and their appurtenances are lighter in weight and more economic of manufacture than similar air cell assemblies heretofore in use.

The invention relates to the undercarriage disclosed in U.S. Patent Number 2,865,652, December 23, 1958.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
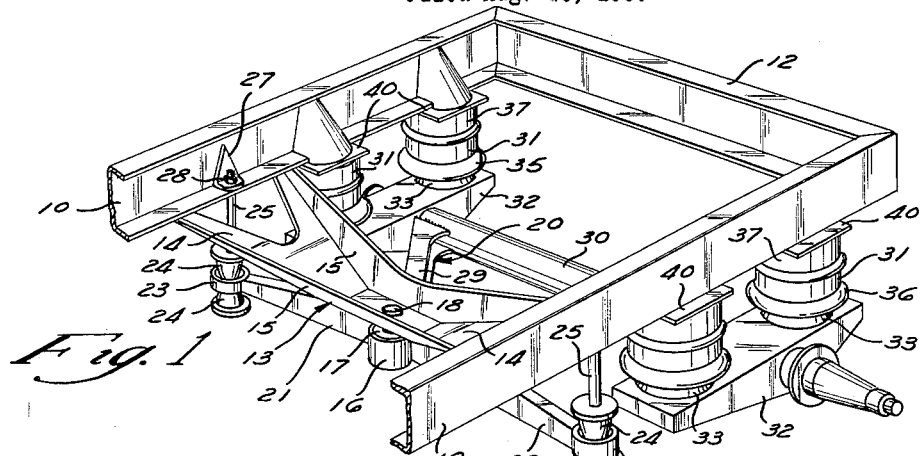
FIG. 1 is a view in perspective of a fragmentary portion of the rear end of a vehicular chassis including the improved air cells and supporting media therefor.
Figure 2:
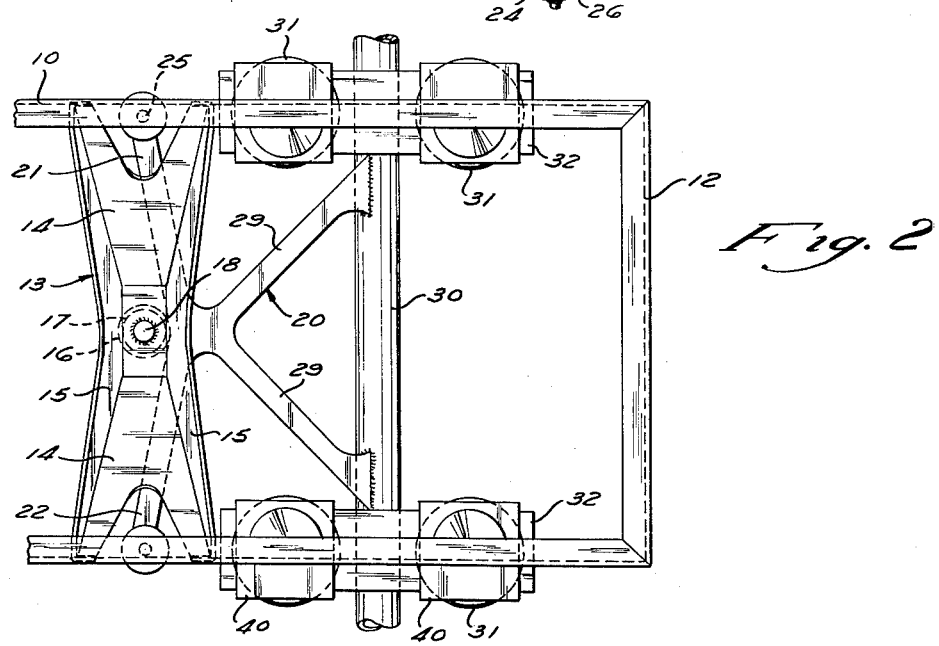
FIG. 2 is a plan view thereof.
Figure 3:
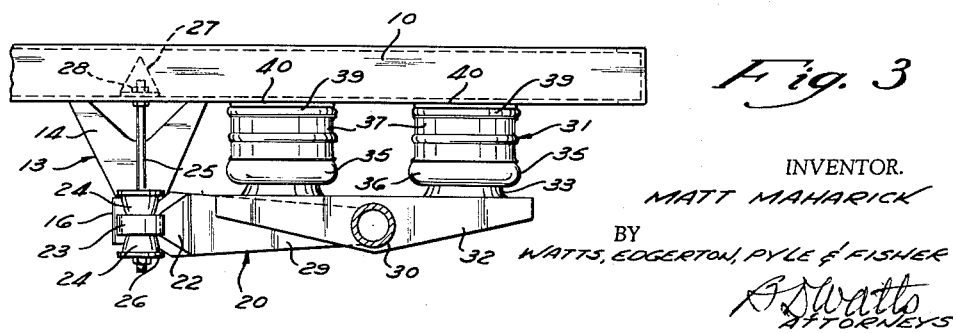
FIG. 3 is a side elevational view of the air cells and draw bar illustrated in FIG. 2.

Referring first to FIG. 1, the vehicle comprises a pair of spaced parallel side rails 10 united by front and rear frame cross members 12, the forward frame member not shown, and a secondary frame cross member 13 formed of fabricated steel plates with a downwardly inclined web 14 and divergent flanges 15 welded at their ends to the frame side rails 10. The ends of the cross members are bifurcated and the central portion of the web is flat to provide a bearing seat for a cylindrical sleeve 16 having an apertured rubber bushing 17 therein for a king pin 18 welded to the flat central portion of the cross member 13. The sleeve is welded in the center of the forward face of a draw bar 20 adjacent a pair of divergent arms 21 and 22 which terminate in bearing rings 23 subjacent the frame side rails 10 intermediate the bifurcated ends of the cross member web 14. The rings 23 retain a pair of opposed truncated rubber cones constituting buffer blocks 24 apertured for bolts 25 that are secured in the lower web of the channel side rails 10. The rubber cones are retained in place by washers 26 affixed on the lower ends of the shank of the bolts 25. The frame side rail flanges are reinforced by angle plates 27 welded to the webs and flanges of the side rails and pierced to retain the bolts 25 and nuts 28 on the lower flange of the side rails. The draw bar 20 is of the general form of an X and is of channeled cross section, the rearwardly divergent legs 29 thereof being welded to a tubular axle 30 which is supported on air cells 31 mounted on bolster blocks 32 subjacent the frame side rails. The bolster blocks are welded to the axle 30 and are formed with frusto conical posts 33 welded to the top of the bolsters 32. The posts are provided with rubber sleeves 35 vulcanized to the upper face thereof and are of greater diameters than the top of the posts so the lower portion thereof is bulged outwardly in an annular fold 36. The central portions of the air cell sleeves 35 are incased in a metallic ring 37 and the closed upper portion thereof is bulged outwardly to form a toric ring 39 with the closed upper end thereof folded inwardly and vulcanized to a top plate 40 secured to the lower face of the lower flange of the channel side rails 10.

As the air cell sleeves 35 flex during the operation of the vehicle, the axle 30 will move laterally, but such movement will be resisted by the draw bar 20, the rubber bushing 17 therein, and the rubber buffer blocks 24.

As the wheels on the axle 30 negotiate the undulations in a highway and the air cell sleeves 35 flex, the magnitude of vertical movement thereof is restricted by the rubber buffer blocks 24 and the lateral movement of the frame is restrained by the rubber bushing 17 and the vertical king pin 18.

The air cells will afford limited side sway but excessive lateral movements of the frame side rails 10 are restricted by the arms of the draw bar 20 which are connected to the bolts 25 and by the rearward legs 29 of the draw bar 20, which in turn are connected to the axle. The forward arms 21 and 22 are connected to the frame and the central portion of the draw bar 20 is yieldably connected to the frame cross members 13.

It will be seen from the foregoing that the structure of the undercarriage is more efficient, more sturdy and of greater economy of manufacture than the structure of the above identified patent.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. An air cell supporting structure for the frame of a road vehicle including parallel frame side rails and a cross member uniting said rails, a secondary transverse pressed steel frame cross member welded to said rails, a king pin in the midpart of said second cross member, a third frame cross member comprising divergent legs, an axle affixed to the ends of said legs, bolsters welded to said axle, yieldable air cells on said bolsters engaged with said frame side rails, transverse arms on said third frame, bearing rings in the free ends thereof, bolts depending from said frame side rails, rubber buffer blocks on said bolts and seated in said bearing rings, a cylindrical bearing sleeve welded to said arms intermediate the ends thereof, and a rubber journal bearing block in said sleeve for the retention of said king pin.

2. An air cell supporting structure for a road vehicle including parallel frame side rails and a cross member uniting said rails, a second transverse pressed steel frame cross member welded to said rails, a king pin in the center of said second cross member, a third frame member comprising four divergent legs, an axle affixed to the ends of the rearward said legs thereof, bolsters welded to said axle, air cells on said bolsters engaged with said frame side rails, said bearing rings in the forward arms of third frame, bolts depending from said frame side rails, frusto conical rubber buffer blocks on said bolts and seated in said bearing rings, a cylindrical bearing sleeve welded to said third frame intermediate the ends thereof, and a rubber journal bearing block in said sleeve for the retention of said king pin.

3. An air cell supporting structure for a road vehicle including parallel frame side rails and a cross member uniting said rails, a secondary transverse pressed steel frame cross member welded to said rails, a king pin in the center of said secondary cross member, a third frame cross member comprising divergent legs, an axle affixed to the ends of certain of said legs, bolsters welded to said axle, laterally flexible air cells on said bolsters engaged with said frame side rails, transverse arms on said third frame, bearing rings in the free ends thereof, bolts depending from said frame side rails, rubber buffer blocks on said bolts seated in said bearing rings, a cylindrical bearing sleeve welded to said third frame in the center thereof, and a rubber journal bearing block in said sleeve for the retention of said king pin.

4. An air cell supporting structure for the frame of a road vehicle including parallel channel frame side rails and a cross channel uniting said rails, a secondary transverse pressed steel frame cross member welded to said rails, a vertical king pin in the midpart of said cross member, a third frame cross member having a sleeve extending around said king pin and forward and rearward divergent legs, an axle affixed to the ends of the rearward legs of said third frame, bolsters welded to said axle, air cells on said bolsters engaged with said frame side rails, bearing rings in the free ends of the forward legs of said third frame, means depending from said frame engaged with said bearing rings to restrain vertical movement of said air cells, and means in said sleeve and around said king pin to yieldably restrain lateral movement of said axle.

5. An air cell supporting structure for a road vehicle including parallel channel frame side rails and a cross channel uniting said rails, a second transverse pressed steel frame cross member welded to said rails, a king pin in the midpart of said cross member, a third frame cross member comprising two pairs of forward and rearward divergent legs, an axle affixed to the ends of the rearward legs, bolsters welded to said axle, laterally yieldable air cells on said bolsters engaged with said frame side rails, bearing rings in the ends of the forward legs of said third frame thereof, bolts depending from said frame side rails, rubber blocks on said bolts and in said bearing rings to restrain vertical movement of said air cells, and means on said second frame to yieldably restrain lateral movement of said axle, said means including said king pin, a rubber bushing therearound and a sleeve carrying the bushing and attached to said third frame cross member.

6. An air cell supporting structure for the frame of a road vehicle including parallel frame side rails and a cross member uniting said rails, a second transverse pressed steel frame cross member welded to said rails, a king pin in the midpart of said cross member, a third frame cross member comprising two pairs of forward and rearward divergent legs, an axle affixed to the ends of the rearward legs, bolsters welded to said axle, air cells on said bolsters engaged with said frame side rails, bearing rings in the free ends of the forward legs of said third frame, means depending from said frame side rails and engaged with said bearing rings to yieldably restrain vertical movement of said air cells, and means on said secondary frame to yieldably restrain lateral movement of said axle, said means including said king pin, a rubber bushing therearound and a sleeve carrying the bushing and attached to said third frame cross member.

References Cited in the file of this patent
UNITED STATES PATENTS

| | | |
|---|---|---|
| 2,865,649 | Chalmers | Dec. 23, 1958 |
| 2,888,271 | Butterfield | May 26, 1959 |